3,456,920
CONCEALED TIRE PUNCTURING DEVICE TO IMPEDE MOVEMENT OF A VEHICLE
John W. Elvington, 4105 Kingsbury,
Wichita Falls, Tex. 76309
Filed Sept. 9, 1968, Ser. No. 758,521
Int. Cl. E04h *17/00*
U.S. Cl. 256—1                                      10 Claims

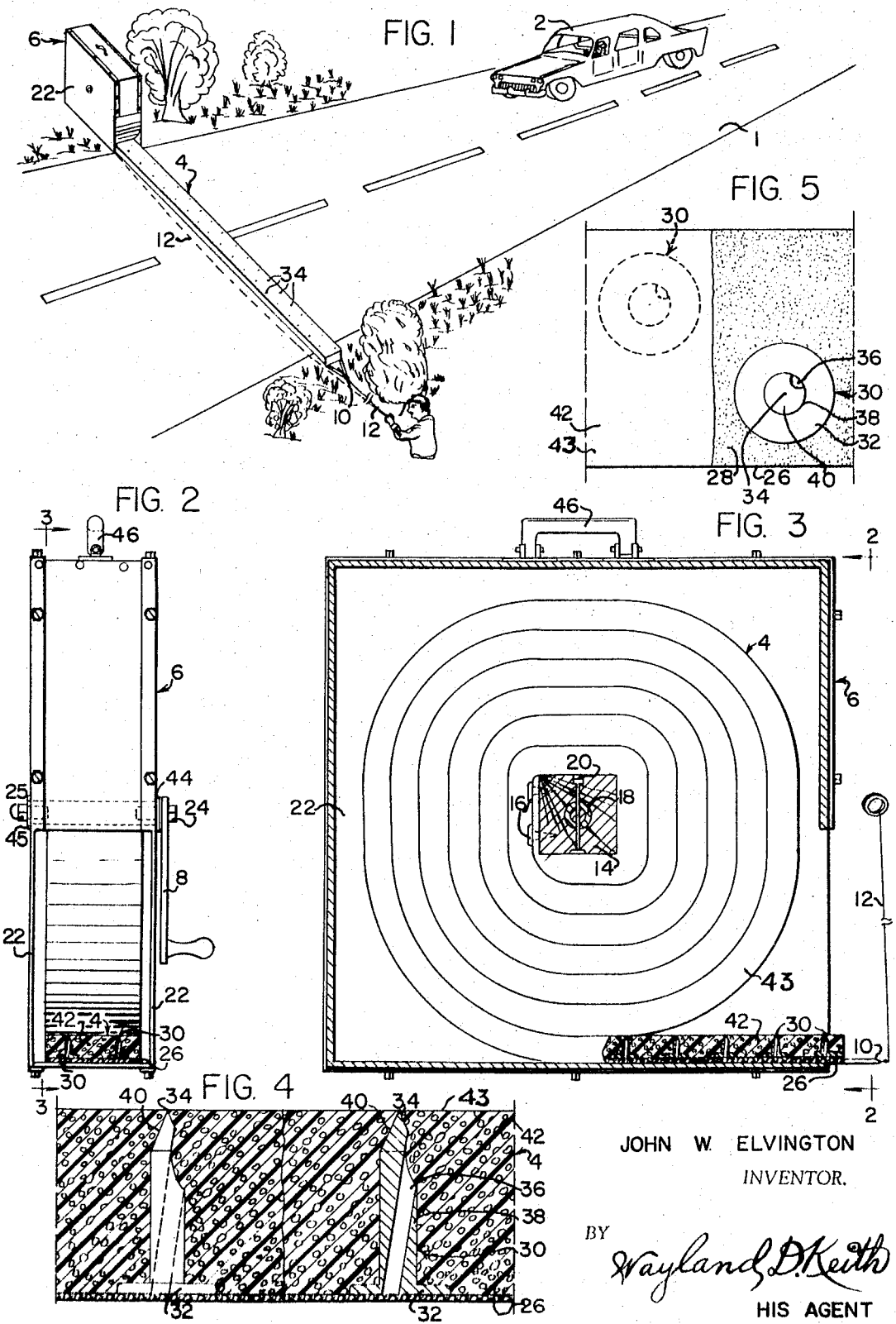

ABSTRACT OF THE DISCLOSURE

A plurality of pointed, hollow, nail-like members concealed within a compressible strip to be extended across a roadway to puncture one or more pneumatic tires of a vehicle, to impede the movement of the vehicle, to aid authorities in the capture of the vehicle and the occupant thereof. The invention utilizes a casing in which a reel is journaled, on which reel a lineal strip of material is reeled thereonto, which strip has pointed, hollow, headed nail-like members detachably secured thereto as by cement, which pointed, hollow, headed nail-like members form puncturing spikes for pneumatic tires to aid in the capture of vehicles and the occupants thereof. The compressible material hides the pointed, hollow, headed nail-like members, which lineal strip may be of a neutral color to blend with the roadway, street, or the like, or it may be a contrasting color, such as yellow, or red to designate caution or danger. The hollow nail-like members are spaced sufficiently close together and staggered in a zigzag pattern along the length of the strip so that one or more hollow puncturing elements will be received by one or more pneumatic tires to permit the tires to become deflated within a short time without a blow-out. A jerk line is provided to jerk the strip across the roadway immediately forward of the vehicle.

---

This invention relates to improvements in vehicle impending devices and more particularly a device to impede the movement of an unauthorized vehicle having pneumatic tires, by puncturing one or more tires.

Vehicle impeding devices have been proposed heretofore, but these, for the most part, lacked the convenience of being wound onto a reel in a case from which the device could be unreeled across a roadway or the like to puncture tires to impede the movement of the vehicle which passes thereover.

The present device is a self contained unit which may be transported from place to place and may be readily unreeled, on short notice, across a roadway or the like, to puncture tires to impede the vehicle, which may fail to stop on command.

Vehicle impeding devices known heretofore exposed to view sharp edges or points which the vehicle operator could readily see would puncture the tires and effort could be made on the part of the operator of the vehicle to avoid such pointed or sharp devices which would puncture and normally cause the pneumatic tires of the vehicle to become flat in due course of time.

The present device is so constructed as to conceal or substantially conceal any sharp points from the view of the operator of the vehicle, and which device may be either of a neutral color, such as the color of pavement or road-bed, or it may be yellow or red, to indicate caution or danger.

The present device is normally wound on a reel within a casing, which casing may be concealed behind an object so that the casing is not discernible to the operator of an on-coming vehicle, and the person using the vehicle impeding device, such as a policeman or other law officer, need not be visible to operators of passing vehicles. Such person as is using the device may be concealed by a barrier, shrubs or the like, and hold a jerk line, which may be of strong, thin cord, such as fishing line, nylon cord, or the like. When a fleeing vehicle approaches the place where the vehicle impeding device is to be strung across the road, street, highway, or the like, the casing containing the rolled, lineal strip, vehicle impeding device is concealed on one side of the roadway, and the operator or officer may conceal himself on the other side of the roadway, and will hold the substantially invisible jerk line, which is attached to the end of the lineal strip or tape which carries pointed, hollow, nail like members, and as the vehicle approaches, the jerk line may be suddenly and quickly jerked to draw the lineal strip impeding device across the roadway at a time when the vehicle operator will have no opportunity to veer the vehicle to avoid crossing the lineal strip of the impeding device, or to stop before the vehicle passes over the device. Therefore, one or more of the sharp, hollow, nail-like members will puncture one or more of the tires of the vehicle, with the probability that each tire of the vehicle will receive one or more punctures, which will cause a positive draining of air therefrom, so that one or more tires of the vehicle will go down within a short time, whereupon, officers may close in on the driver of the vehicle, who would not stop before crossing the vehicle impeding device.

An object of this invention is to provide a vehicle impeding device which will present sharp, pointed, hollow, nail-like members concealed within a tape, and which members are so attached to the tape as to be concealed by compressible, sponge-like elastomer material, that a vehicle operator would not be aware that the tires of the vehicle are in danger of being punctured by passing thereover.

Another object of the invention is to provide a reel on which a lineal strip or tape may be reeled thereonto, with elastomer, sponge-like material on the lineal strip or tape to conceal pointed, hollow, headed nail-like members therein so, when the lineal strip is extended across a roadway or the like, will maintain the points thereof in concealed, upright position.

Still another object of the invention is to provide a lineal tape having a fabric or film base which is coated with a permanently tacky, pressure sensitive cement to detachably secure a flat head of a pointed, hollow, nail-like members so as to conceal the pointed members in a compressible material when the device is extended across a roadway or the like.

Another object of the invention is to provide a tire puncturing device, which will puncture a pneumatic tire as the tire passes thereover and which will positively release air therefrom within a relatively short time to enable the vehicle to be immobilized.

Still another object of the invention is to provide a device for puncturing the pneumatic tires of a vehicle, which device is normally coiled on a reel within a casing and which may be suddenly jerked across the path of a vehicle just prior to the vehicle passing thereacross.

A further object of the invention is to provide a vehicle impending device to puncture tires, which device is simple in construction, easily carried from place to place, and the pointed, hollow, headed nail-like puncturing members may be replaced without having to discard the entire device after each use.

Another object of the invention is to provide a device by which to impede a fleeing car without exposing the officers to gunfire, but which device is completely effective.

Still a further object of the invention is to provide a lineal strip of elastomer, sponge-like material having a waterproof surface coating or film thereon, in which elastomer, sponge-like material, pointed, hollow, nail-like members are supported in upright position, for puncturing pneumatic tires, upon a vehicle tire passing thereacross.

With the above objects in view and others which will become manifest as the description proceeds, the invention consists of novel details of construction and combinations of details and parts more fully brought out in the appended claims.

Reference is to be had to the accompanying drawings which form a part of the specification, in which like reference characters designate like parts in the several views thereof, in which:

FIG. 1 is a perspective view showing a roadway, a vehicle and showing a jerk cord or line in dashed outline extending thereacross and showing a vehicle impeding device extended thereacross in full outline;

FIG. 2 is a sectional view of the tire puncturing device taken on line 2—2 of FIG. 3 looking in the direction indicated by the arrows;

FIG. 3 is a sectional view of the casing of the tire puncturing device taken on line 3—3 of FIG. 2 looking in the direction indicated by the arrows, with parts shown in full outline;

FIG. 4 is an enlarged, substantially full sized sectional view of a portion of the lineal strip, showing the film or fabric tape therein having an elastomer cement covering thereon and showing sponge elastomer material, such as sponge plastic or sponge rubber associated therewith, which sponge elastomer material is fitted over the sharp pointed, hollow, nail-like members; and FIG. 5 is a fragmentary top plan view of a portion of the lineal strip with a portion of the sponge-like material removed therefrom and showing a pointed, hollow, headed nail-like member attached thereto with permanently tacky, pressure sensitive material and another portion of the lineal strip showing the sponge like material thereon with a pointed, hollow, headed nail-like member in dotted outline therein.

With more detailed reference to the drawing, the numeral 1 designates a roadway with a pneumatically tired vehicle 2 shown thereon approaching a vehicle impeding lineal strip generally designated by the numeral 4, which lineal strip is capable of being coiled or reeled into a housing 6 by operation of a crank or operator means 8, as will be more fully brought out hereinafter. The lineal strip has a tab or loop 10 on the end thereof to which a cord 12 is attached to enable the movement of the lineal strip 4 across a roadway 1 immediately ahead of vehicle 2, so that the operator of the vehicle 2 is unaware that the tire piercing device within lineal strip 4 is eminent.

The housing 6 consists of a center core 14 which may be of a material suitable for attachment of lineal strip 4 with fastening devices, such as indicated at 16. If the core 14 is made of wood, the fastening devices 16 may be screws, nails, or the like, however, the wooden core is merely shown for purposes of illustration. The core 14 has an axle 18 through which a pin 20 passes and through the core 14, so as to secure the core 14 integral with the shaft 18. The shaft 18 is journaled within the sides 22 of housing 6 and the crank or operator means 8 is secured to the axle 18 by a bolt 24 so upon turning of the crank or operator means 8, the axle 18 and core 14 will be rotated to reel in the lineal strip 14, as indicated in FIG. 3.

The lineal strip 4 has a base 26 of fabric or film and which is preferably coated with a permanently tacky, pressure sensitive cement 28 on which the flat heads 32 of the pointed, hollow, headed nail-like members 30 are detachably secured by cement, such as permanently tacky, pressure sensitive cement to the lineal film 26, so that the point 34 will be in upright position. The pointed, hollow, headed nail-like member 30 has a longitudinal, angulated bore 36 therethrough which extends upward through the body 38 of the pointed, hollow, headed nail-like member 30 and has the hole extending outward through a side of the angulated face 40 a spaced distance downward from the point 34 of the pointed, hollow, headed nail-like member 30.

A compressible material 42 of a thickness that will approximately be as thick or thicker than the length of the pointed, hollow, headed nail-like member 30 is applied over these nail-like members and attached to the permanently tacky, pressure sensitive cement surface 28 of the tape or film 26, so that the points 34 of the nail-like members will be hidden or substantially hidden. It is preferable to have this compressible material 42 of a sponge elastomer material like sponge plastic, sponge rubber or various other natural or synthetic compressible material that will readily regain their shape once they are compressed and released. It is preferable to have the coiled lineal strip 4 within a casing of sufficient length to extend across the roadway, street or highway to be policed and have the strong, thin cord 12 extending from one end of the lineal strip 4 as by attachment to the loop 10 so that the lineal strip may be instantly jerked across the roadway, as indicated in FIG. 1 with only an inconspicuous cord 12 being extended thereacross prior to the approach of the vehicle 2.

The bolts 24 and 25 may present sufficient tension on washers 44 and 45 to hold the lineal strip 4 against undue reeling when the cord 12 is pulled, however, the shaft 18 rotates within the bearings in side plates 22 with such freeness that the lineal strip 4 may be readily drawn across the roadway 1. A handle 46 is provided for carrying the case from place to place and when the lineal strip 4 is reeled into housing 6 by turning crank or operator means 8. While a crank 8 is shown to rotate the reel, it is to be understood that this is merely representative of a form of operator means without being restricted thereto. The entire unit for a sufficient length to extend across a roadway, is comparatively small and easy to handle by law enforcement officers or other persons assigned to cover the escape route of a wanted vehicle.

The lineal strip of elastomer, sponge-like material has a waterproof coating, film or skin 43 thereon to seal the sponge-like material against absorption of water. The pointed, hollow, nail-like members are completely enclosed within the sponge-like material until the material is compressed and the nail-like member pierces through the waterproof coating or skin, whereupon, after the strip has been used, the particular section from which the nail-like members have been removed by a tire passing thereover are cut therefrom and a new section containing the pointed, hollow, nail-like members is inserted within the length of the lineal strip so as to maintain the lineal strip the desired length and fully studded with tire puncturing nail-like members.

While some methods of use have been described, it is to be understood that it may be used to apprehend a fleeing motorist in combination with material road blocks, police cars, or the like.

Having thus clearly shown and described the invention, what is claimed as new and desired to be secured by Letters Patent is:

1. A device for puncturing pneumatic tires of a vehicle, which device comprises;
 (a) a lineal strip,
 (b) a plurality of pointed, hollow nail-like members, each having a head,
  (1) the head of each said nail-like member being detachably secured to said lineal strip so the point of each nail-like member will extend upward therefrom,
 (c) a compressible material covering at least a portion of said pointed, hollow, headed nail-like members above the head thereof, and
 (d) said lineal strip adapted to be positioned on a roadway with the pointed, hollow, headed nail-like members extending upwardly.

2. A device for puncturing pneumatic tires of a vehicle, as defined in claim 1; wherein
   (a) one end of said lineal strip is attached to a reel like member, and
   (b) operator means associated with said reel for rotating said reel to wind said lineal strip thereonto.

3. A device for puncturing pneumatic tires of a vehicle, as defined in claim 1; wherein
   (a) said compressible material covering said nail-like members is at least the thickness of the length of one of said pointed, hollow nail-like members.

4. A device for puncturing pneumatic tires of a vehicle, as defined in claim 3; wherein
   (a) said compressible material is a waterproof coated, elastomer, sponge-like material.

5. A device for puncturing pneumatic tires of a vehicle, as defined in claim 1; wherein
   (a) said plurality of pointed, hollow, nail-like members are arranged in staggered relation on said lineal strip.

6. A device for puncturing pneumatic tires of a vehicle, as defined in claim 1; wherein
   (a) the hollow portion of each nail-like member extends at an acute angle downward from a face of said nail-like member and through the head thereof to form an open passage therethrough, with the points of said pointed, hollow, nail-like members being located centrally of the body thereof.

7. A device for puncturing pneumatic tires of a vehicle, as defined in claim 1; wherein
   (a) the head of each said pointed, hollow, nail-like member is cemented to a face of said lineal strip, which nail-like members are detachable therefrom after the pointed, hollow, nail-like members become engaged with the tire of a vehicle.

8. A device for puncturing pneumatic tires of a vehicle, as defined in claim 1; including
   (a) a reel support member,
      (1) an axle mounted on said reel support member,
      (2) a reel mounted on said axle for rotation about the axis thereof,
   (b) an end of said lineal strip is secured to said reel,
   (c) operator means associated with said reel to rotate said reel about the axis thereof to wind said lineal strip thereonto.

9. A device for puncturing pneumatic tires of a vehicle, as defined in claim 8; including
   (a) a housing forming said reel support member,
      (1) said housing having an opening formed therein to permit said lineal strip to be drawn therethrough.

10. A device for puncturing pneumatic tires of a vehicle, as defined in claim 9; including
   (a) a cord which is attached to the outer end of said lineal strip, said cord to be operated from a point remote from said housing, to withdraw said lineal strip therefrom.

References Cited

UNITED STATES PATENTS

| | | | |
|---|---|---|---|
| 1,721,978 | 7/1929 | Sherwood | 256—1 |
| 2,353,386 | 7/1944 | Bourcier | 256—1 |
| 2,912,229 | 11/1959 | Persgard | 256—1 |
| 3,001,332 | 9/1961 | Wilder | 52—303 |

FOREIGN PATENTS

| | | |
|---|---|---|
| 322,224 | 12/1929 | Great Britain. |
| 593,355 | 2/1934 | Germany. |

DENNIS L. TAYLOR, Primary Examiner